United States Patent
Bastioli et al.

(10) Patent No.: US 6,348,524 B2
(45) Date of Patent: *Feb. 19, 2002

(54) COMPLEXED STARCH-CONTAINING COMPOSITIONS HAVING HIGH MECHANICAL PROPERTIES

(75) Inventors: Catia Bastioli, Novara; Vittorio Bellotti, Fontaneto D'Agogna; Gianfranco Del Tredici, Sesto Calende; Italo Guanella, Romentino; Roberto Lombi, Novara, all of (IT)

(73) Assignee: Novamont S.p.A., Novara (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/335,238

(22) Filed: Jun. 17, 1999

(30) Foreign Application Priority Data

Jun. 17, 1998 (IT) .......................................... TO98A0524

(51) Int. Cl.[7] .................................................. C08J 3/04
(52) U.S. Cl. ............................. 524/47; 524/52; 524/734
(58) Field of Search ............................. 524/47, 50, 52, 524/734

(56) References Cited

U.S. PATENT DOCUMENTS 5,334,634 A  8/1994  Bastiolo et al.
5,362,778 A  11/1994  Famili et al.
5,412,005 A  5/1995  Bastioli et al.
5,861,461 A  * 1/1999  Lee et al. ................. 525/54.26

FOREIGN PATENT DOCUMENTS

| IT | TO 96A000890 | 5/1996 |
| WO | 92/19680 | 11/1992 |
| WO | 95/24447 | 9/1995 |
| WO | 98/20073 | 5/1998 |

OTHER PUBLICATIONS

Basatioli, C., "Starch/Vinyl–Alcohol Copolymer Interactions," Eisevier Science B.V., pp. 200–213 (1994).

English translation of TO 96A000890 (B3).

* cited by examiner

Primary Examiner—Edward J. Cain
Assistant Examiner—Wynozebshi LeeKat
(74) Attorney, Agent, or Firm—Bryan Cave LLP

(57) ABSTRACT

Heterophasic compositions comprising starch and a thermoplastic polymer that is incompatible with the starch, in which the starch constitutes the discontinuous phase and the thermoplastic polymer the continuous matrix, having an impact strength greater than 30 KJ/m2 (measured on blown film of 30 microns thick at 10° C. and RH less than 5%), and further characterised by the presence in the X-ray diffraction spectrum of a peak at an angle 2-theta from 13 to 14° the ratio of the intensity of which to that of the peak of the amorphous starch which occurs at 20.5°, is less than 2 and greater than 0.02.

17 Claims, 2 Drawing Sheets

COMPLEXED STARCH-CONTAINING COMPOSITIONS HAVING HIGH MECHANICAL PROPERTIES

DESCRIPTION

Figure 1:
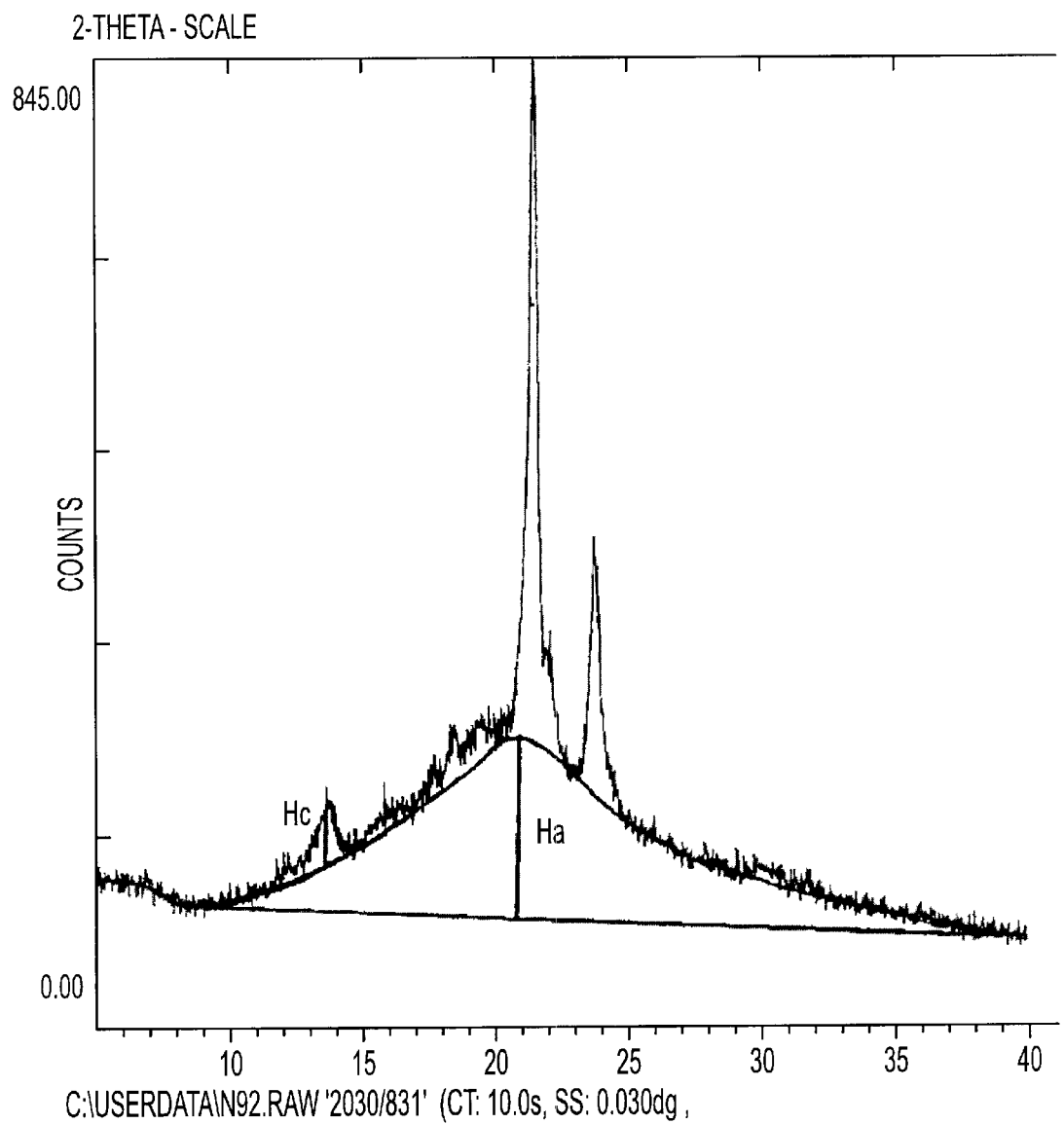

The present invention relates to heterophasic polymeric compositions having a high resistance to ageing, even under conditions of low temperature and humidity, comprising thermoplastic starch and a thermoplastic polymer incompatible with starch, in which the starch constitutes the dispersed phase and the polymer the continuous phase.

The invention relates particularly to manufactured products which maintain high impact strength and tear strength in low humidity conditions.

It is known that products (in particular films) manufactured from compositions containing thermoplastic starch and a thermoplastic polymer incompatible with starch, in which the starch constitutes the dispersed phase, show a significant deterioration in their mechanical properties, in particular, their impact strength and tear strength, due to the fact that the starch gives up or absorbs water until it reaches equilibrium with the ambient humidity at its interface.

In relatively low humidity conditions, the material tends to become brittle, as the dispersed phase becomes insufficiently plasticised due to the loss of water which takes the glass transition temperature above ambient temperature.

This phenomenon can damage the interface with the matrix when the interface is not sufficiently bonded.

Under these conditions, when the starch particles constituting the dispersed phase are subjected to stress, they are unable to deform and absorb the stress, but instead remain rigid, thus initiating a tear.

Italian patent application No. T096A000890 filed by the Applicant describes compositions comprising thermoplastic starch and a thermoplastic polymer incompatible with the starch, having improved characteristics of resistance to ageing under conditions of relatively low humidity, obtained by introducing an agent having an interfacing action during the mixing of the components. This compatibility-inducing action improves the adhesion between the matrix and the dispersed particles.

Reducing the interface tension also enables the dimensions of the particles to be reduced to submicronic values, whereby the materials have the characteristics of a polymeric alloy. Compositions comprising starch, a thermoplastic polymer and a plasticiser are widely described in patent literature.

However, the concentrations of these plasticisers at which the mechanical properties of the compositions are greatest are never taught, nor suggested, in the prior art.

EP-A-0 327 505 describes compositions in which the plasticiser is used in a quantity of from 0.5 to 15%, preferably between 0.5 and 5% by weight, together with such quantities of water that the sum of the plasticiser and the water does not exceed 25% by weight of the compositions (the quantitative minimum of water in these compositions is 10% by weight).

WO92/19680 describes compositions comprising starch, a polyester of a hydroxyacid or the corresponding lactone such as, for example, polycaprolactone, and a plasticiser usable in a quantity of from 1 to 50% by weight, preferably 1–40%, and more preferably 5–25% by weight of the composition.

The compositions preferably have a final water content of between 1.5 and 5% by weight (measured on leaving the extrusion press, before conditioning).

In the aforementioned document, there is no use of nor any indication of the existence of a possible critical range of the concentration of the plasticiser corresponding to that for obtaining very high mechanical properties, nor is there any indication of which plasticisers are suitable for this purpose.

The quantity of plasticiser used in the examples is always greater than 10% by weight of the composition.

U.S. Pat. No. 5,334,634 describes compositions comprising starch, an ethylene-vinyl alcohol copolymer and a plasticiser usable in a quantity of from 0.5 to 100% by weight of the starch.

In this case also, the quantity of plasticiser effectively used is always greater than 10% by weight of the composition.

It is known that starch, in particular, its amylose fraction, forms "V"-type complexes with synthetic polymers such as polyethylene vinyl alcohol or polyethylene-acid acrylate (C.Bastioli and others in "Biodegradable Plastics and Polymers", pages 200–213; 1994, Elsevier Science). In such multiphase systems in which the synthetic polymer comprises the continuous phase and the starch the dispersed phase, the complex acts as a compatibility-inducer or phasing agent.

Similar complexes can form between starch and aliphatic polyesters or aliphatic/aromatic copolyesters. However, if, in the preparation of the compositions comprising starch and the aforementioned polyesters, relatively high quantities of the starch plasticisers are used to ensure the plasticity of the material under the conditions of use of the manufactured product and low specific energy for destructurization and complexation is used, the quality of the interface is insufficient to ensure the toughness of the material at low temperatures and humidity in the presence of the plasticiser itself.

Furthermore, if plasticisers which are solid at room temperature are used in relatively high concentrations, at which the complex between starch and incompatible polymer can form in a quantity sufficient to ensure an effective compatibility-inducing action, these plasticisers cause, in conditions changing from high to low relative humidity, brittleness in the material.

It has unexpectedly been found that it is possible to prepare heterophasic compositions comprising starch and a thermoplastic polymer incompatible with starch, in which the starch constitutes the dispersed phase and the thermoplastic polymer the continuous matrix, which compositions have characteristics of high impact strength even when passing from conditions of high to low relative humidity if they are prepared using a quantity of plasticiser that is liquid at room temperature comprised within a critical range wherein the concentration of the complex between starch and the incompatible polymer reaches a maximum, and a specific energy of destructurization of starch higher than a certain value.

The critical quantity of plasticiser, which is preferably glycerin, is generally from 2 to 8% and preferably from 3 to 7% by weight of the starch and the thermoplastic polymer. Quantities outside this range are, however, possible, depending on the type of plasticiser and its efficacy.

The specific energy for the destructurization of the starch and its complexation are comprised from 0,1 to 0.5 Kw.h/Kg, preferably from 0,15 to 0,4 Kw.h/Kg and most preferably from 0,2 to 0,35 Kw.h/Kg.

For specific energy for the destructurization and complexation of the starch it is to meant the energy supplied by an extruder the screw or screws of which are capable of developing a specific energy of at least 0,1 Kw.h/Kg at the extrusion temperature of 120–210° C.

The specific energy is determined according to the formula: A×B×C/D×E×F wherein

A=engine power

B=RPM

C=energy absorption

D=RPM max

E=energy absorption max

F=flow rate

Until now, critical values as indicated above had never been used nor suggested in prior art compositions.

It has been discovered, and this constitutes a characterising aspect of the invention, that the complex of starch and incompatible polymer reaches maximum concentration values within the aforesaid critical range.

Figure 2:
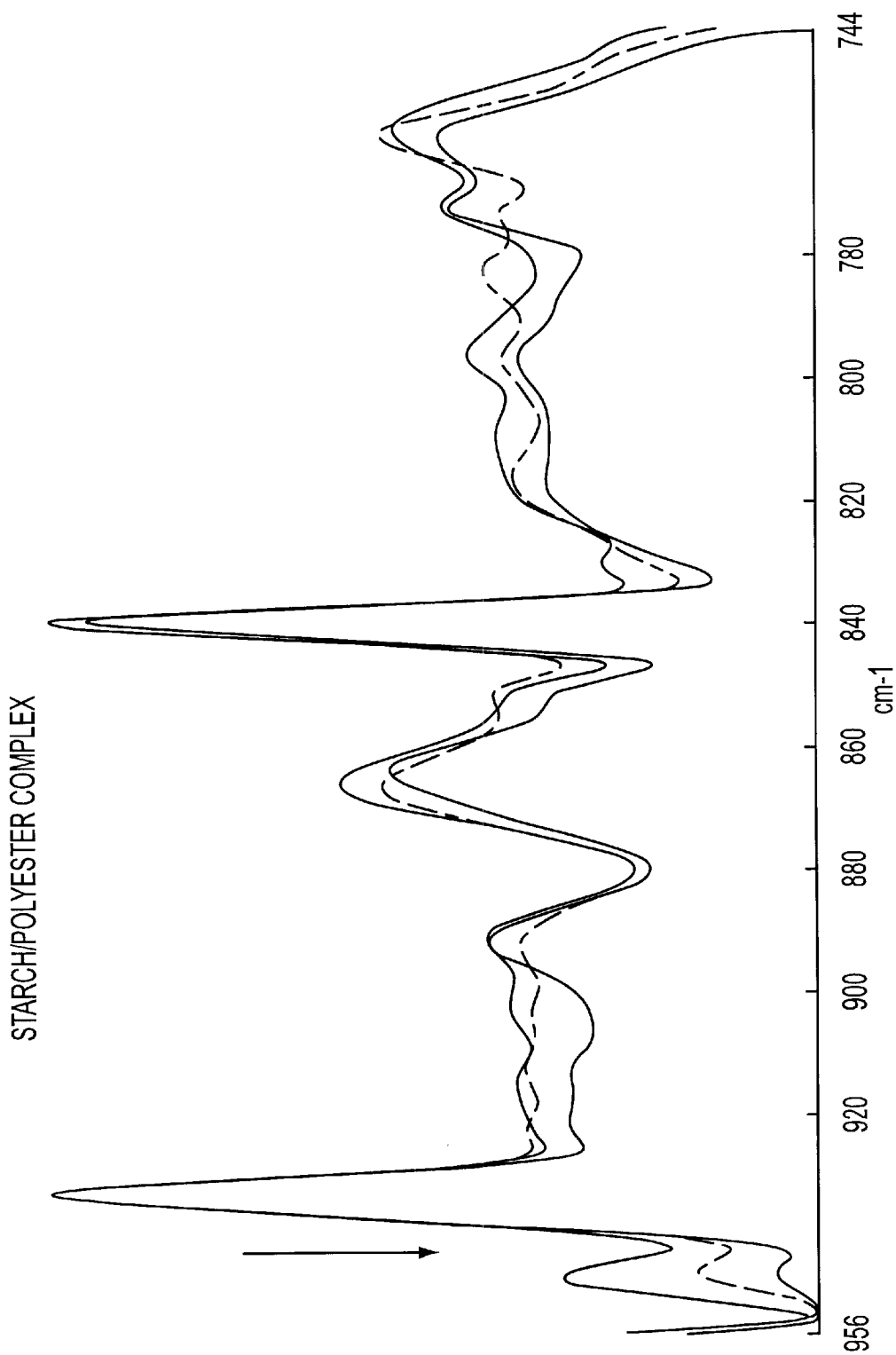

The presence of the complexes of starch and incompatible polymer can be demonstrated by the presence in the second derivative FTIR spectra of a band at a wavelength of 947 cm-1 (specific to the complex) and in the X-ray diffraction spectra of a peak in the range of 13–140 on the 2 theta scale (with Cu $K_{alfa}$ radiation of 1.5418 A°). In both cases, the position of the band or the peak of the complex remains unchanged, even on changing the nature of the complexed polymer. FIGS. 1 and 2 show the X-ray and second derivative FTIR spectra, and are typical of the formulations based on starch and aliphatic polyesters (PCL in particular).

It has been found that in the X-ray spectra of the compositions of the invention, the Hc/Ha ratio between the height of the peak (Hc) in the range of 13–14° of the complex and the height of the peak (Ha) of the amorphous starch which appears at about 20.5° (the profile of the peak in the amorphous phase having been reconstructed) is less than 2 and greater than 0.02. In the spectrum of FIG. 1, the heights Hc and Ha, are indicated for the peaks of the complex and the amorphous starch respectively.

In case of crystalline polymers with a crystallinity content higher than 30% the lower limit of the ratio Hc/Ha is 0.2; in case of amorphous polymers or polymers with a cristallinity content less than 30% the lower limit of the ratio Hc/Ha is lower than 0.2.

The heterophasic compositions of the invention therefore comprise starch, a thermoplastic polymer incompatible with the starch, a starch plasticiser or a mixture of starch plasticisers, in which the starch constitutes the discontinuous phase and the thermoplastic polymer the continuous phase, and are characterised in that they form films having characteristics of high impact strength higher than 30 Kj/m$^2$, preferably higher than 45 Kj/m$^2$ and most preferably higher than 60 Kj/m$^2$ (measured on blown film 30 micron thick at 10° C. and less than 5% relative humidity) and have an X-ray spectrum having a peak at angle 2 theta in the range from 13 to 14° with an intensity related to that of the peak of the amorphous starch which appears at an angle 2 theta of 20.5° less than 2 and greater than 0.02.

The compositions are obtainable by extrusion of a melt comprising starch, the thermoplastic polymer, the plasticiser in a quantity within the critical range, and water in a quantity less than 5% by weight (measured on leaving the extrusion press, before conditioning) and supplying a specific energy of at least 0,1 Kw.h/Kg and lower than 0,5 Kw.h/Kg.

The preparation of the compositions by extrusion is carried out according to known temperature conditions, operating, for example, at temperatures of between 120 and 210° C., preferably from 130 to 190° C. Suitable usable extruders are those provided with screws having a "reverse" profile for more than 30% of the length of the screw (a reverse profile causes the material to advance with a piston effect).

The water content in the extrusion stage can be high in the phase of destructurization of starch and can be regulated at the end of the estrusion at the desired values of less than 5% by weight by degassing or by using a starting starch with a low water content (the water content is measured at the exit of the extruder, prior conditioning).

If the compositions or the manufactured products obtainable therefrom are washed with water, the plasticiser contained therein is extracted but the compositions and the manufactured product maintain mechanical properties, in particular impact strength, comparable to the properties of the film before washing. These compositions and manufactured products also form part of the invention.

The starch-incompatible thermoplastic polymers are preferably chosen from the aliphatic (co)polyesters obtained from hydroxyacids having 2 or more carbon atoms, and from the corresponding lactones or lactides, or from aliphatic bicarboxylic acids having 2–22 carbon atoms, and from diols having 2–22 carbon atoms, polyester-amides, polyester-urea and aliphatic-aromatic copolyesters and mixtures thereof.

These thermoplastic polymers, or mixtures thereof, have a melting point lower than 130° C. and preferably lower than 110° C.

Representative examples of the polymers mentioned above are:

poly-epsylon-caprolactone, polyethylene- and polybutylene-succinate, polyhydroxybutyrate-hydroxyvalerate, polylactic acid, polyalkyleneadipate, polyalkyleneadipate-succinate, polyalkyleneadipate-caprolactame, polyalkyleneadipate-epsylon caprolactone, polyadipate of diphenol diglycidylether, poly-epsylon-caprolactone/epsylon-caprolactame, polybutylene adi-pate-co-terephthalate, polyalkylenesebacate, polyalkylene-azelate and copolymers thereof or mixtures thereof.

These polymers can also be "chain-extended" with diisocyanates, polyepoxides and similar multifunctional compositions.

Poly-epsylon-caprolactone and the aliphatic-aromatic copolyesters are preferred. Other polymers which can be used are the esters and ethers of cellulose and of starch.

The starch-incompatible polymer is present in a quantity sufficient to form the continuous phase of the heterophasic composition. In general, this quantity is between approximately 30 and 90% by weight of the starch.

The polymers can be used in mixtures having smaller proportions of polymers of the ethylene/vinyl alcohol, ethylene/acrylic acid type and polyvinylalchol.

The usable starch is native starch such as, for example, corn, potato, rice, tapioca starch, or is a physically or chemically modified starch such as, for example, ethoxylated starch, starch acetate and hydroxypropylated starch, cross-linked starch or oxidated starch, dextrinized starch, dextrins and mixtures thereof.

The starch plasticisers which can be used are polyhydric alcohols having from 2 to 22 carbon atoms, in particular, polyhydric alcohols having from 1 to 20 hydroxylated units containing from 2 to 6 carbon atoms, the ethers, thioethers and the organic and inorganic esters of these polyhydric alcohols.

Examples of plasticisers that can be used are: glycerine, ethoxylated polyglycerol, ethylene glycol, polyethylene glycol, 1,2-propandiol, 1,3-propandiol, 1,4-butandiol, neopentylglycol, sorbitol monoacetate, sorbitol diacetate, sorbitol monoethoxylate, sorbitol diethoxylate and mixtures thereof.

The compositions can also include interfacial agents of the kind described in Italian patent application T096A000890, chosen from:

a) esters of polyhydric alcohols with mono- or polycarboxylic acid having a dissociation constant pK less than 4.5 (with reference to the pK of the first carboxylic group in the case of the polycarboxylic acids), and a hydrophilic/lipophilic index (HLB) greater than 8;

b) esters of polyhydric alcohols with mono- or polycarboxylic acid having fewer than 12 carbon atoms, pK values greater than 4.5, and HLB indexes of from 5.5 to 8;

c) esters of polyhydric alcohols with C12–C22 fatty acids, having an HLB index of less than 5.5;

d) non-ionic, water soluble surfactants, and e) products of the reaction between aliphatic or aromatic diisocyanates and polymers containing terminal groups that react with the diisocyanates.

The compositions of the invention can also contain additives such as urea in a quantity of up to 20% by weight, compounds of boron, particularly boric acid, proteins such as casein, gluten and abietinic acid or rosinic acid, natural rubbers, flame retardant agents, antioxidants, fungicides, herbicides, fertilisers, opacifiers, compositions having a repellent effect on rodents, waxes, antislipping agents (such as erucamide, calcium stearate, zinc stearate).

They can also contain organic and inorganic fillers from 0.5 to 70% by weight and natural fibers. The compositions of the invention find particular application in the preparation of films, sheets, in thermoforming and, in general, in all applications in which good mechanical properties of the manufactured product are required, together with high resistance to ageing, even under conditions of low temperature and humidity.

Examples of products which can be manufactured using the compositions of the invention include, in addition to those mentioned above, bags, laminates, moulded and blown articles, expanded sheets, expanded materials, biofillers for tyres, backsheets for diapers, wrapping films, mulching films, multilayer films, sacks for mowing grass, shoppers, nonwoven fabric, toys, pet toys, dog collars, products with controlled release for use in the agricultural field, threads.

The following examples are given to illustrate and not to limit the scope of the invention.

EXAMPLE 1

A mixture formed from (parts by weight):

| | |
|---|---|
| Globe 03401-Cerestar natural starch* | 27 |
| Tone-787 PCL | 65 |
| glycerine | 4.5 |
| water | 3.5 |
| | 100.0 |

*water content 12% wt was supplied to a two screw OMC extruder of 60 mm diameter, L/D=36, RPM=180.

The temperature profile was as follows: 60/145/175/180×4/155×2° C.

It was operated with free degassing.

The specific energy supplied was 0,4 Kw.h/Kg.

The extruded material was pelletised. The water content was 1.3% by weight.

The pellets were used to manufacture films using Ghioldi apparatus provided with Maillefer-type screws of 60 mm diameter and L/D=30. The thermal profile was as follows: 90/120/140/150×3/147×2° C.

The film head had a diameter of 180 mm.

The film produced, approximately $30\mu$ thick, was tested as such for its mechanical properties. A sample of the same film was on the other hand immersed in water for 24 hours to remove the starch plasticisers; after this, the samples taken from the washed film were left to condition for 72 hours in an environment with a temperature and humidity equal to those used for detecting the mechanical properties.

EXAMPLE 2

A mixture of (parts by weight):

| | |
|---|---|
| Globe 03401 corn starch | 33.4 |
| Tone-787 PCL | 54.3 |
| glycerine | 5.8 |
| water | 6.5 |
| | 100.0 | was supplied to a two screw APV-2030 extruder; L/D=35+5XLT; RPM=170; thermal profile: 60/100/170×14° C.

The extruder was operated with free degassing.

The specific energy supplied was 0,17 Kw.h/Kg.

The extruded material was pelletised. The water content was 1.5% in weight.

The pellets were used to produce a sheet via cast-extrusion, using a modified AEMME extruder provided with 1:3 constant taper screws; diameter 30 mm; L/D=25; RPM=35. The extruder had a flat head 150 mm wide with a lip aperture of 0.8 mm. The sheet obtained was 0.6 mm thick.

A quantity of pellets was separately made into a film as described in example 1 to obtain samples to test for their mechanical properties (samples of the film as produced and washed in water).

EXAMPLE 3

The test of example 2 was repeated using a composition (parts by weight) of 33.4 parts starch of the type used in example 2, 54.3 parts of Tone-787 PCL, 4.8 parts of glycerine and 7.5 parts of water. The film thus obtained was tested for its mechanical properties (film as produced and washed in water).

COMPARISON EXAMPLE 1

A mixture formed from (parts by weight):

| | |
|---|---|
| Globe 03401 corn starch | 33.4 |
| Tome-787 PCL | 54.3 |
| glycerine | 9.7 |
| water | 5.5 |
| | 100.0 | was mixed in an extruder and made into a film as in example 1.

The specific energy supplied was 0,22 Kw.h/Kg.

The film obtained was tested for its mechanical properties (film as produced and washed in water as in example 1).

COMPARISON EXAMPLE 2

A composition comprising 65 parts potato starch at 6% humidity and 35 parts of a mixture of glycerine: sorbitol 1:1 by weight (sorbitol is solid at ambient temperature) was supplied to the two screw APV-2030 extruder, as used in example 1, operating with the following thermal profile: 60/100/190×14° C. Compounding was done with active degassing to obtain an extrudate having a water content of less than 0.5%.

Then, 35 parts of dried pellets and 65 parts of Tone-787 PCL were mixed in an APV-2030 extruder; the extruded material was made into pellets and finally made into a film of approximately 30µ thickness, exactly as in example 1.

EXAMPLE 4

The test of example 3 was repeated with the only difference being that 3.8 parts glycerine and 8.5 parts water were used.

The film thus obtained was tested for its mechanical properties (film as produced and washed in water as in example 1).

EXAMPLE 5

A mixture formed from (parts by weight):

| | |
|---|---|
| Globe 03401-Cerestar natural starch | 26.4 |
| Ecoflex ® | 63.8 |
| glycerine | 5.5 |
| water | 4.3 |
| Erucamide | 0.3 |
| | 100.0 | was supplied to a two screw OMC extruder of 60 mm diameter, L/D=36, RPM=180.

Ecoflex is a registered trade mark of BASF and refers to a polybutylene adipate-co-terephthalate copolymer.

The temperature profile was as follows: 60/140/175/180× 4° C.

It was operated with free degassing.

The specific energy supplied was 0,36 Kw.h/Kg.

The extruded material was pelletised. The water content was 1.7% by weight.

The pellets were used to manufacture films using Ghioldi apparatus provided with Maillefer-type screws of 60 mm diameter and L/D=30. The thermal profile was as follows: 120/135/145×5/140° C.

The film head had a diameter of 100 mm.

The film produced, approximately 30µ thick, was tested as such for its mechanical properties. A sample of the same film was on the other hand immersed in water for 24 hours to remove the starch plasticisers; after this, the samples taken from the washed film were left to condition for 72 hours in an environment with a temperature and humidity equal to those used for detecting the mechanical properties.

TABLE 1

PROPERTIES OF BLOWN FILM AT 23° C. & 50% RH (ASTM Standard d 882)

| Examples | Breaking Load Mpa | Breaking elongation % | Modulus of elasticity Mpa | Breaking energy KJ/m2 | Hc/Ha |
|---|---|---|---|---|---|
| 1 as produced | 37.1 | 880 | 503 | 8600 | 0.44 |
| 1 washed | 31.6 | 747 | 501 | 7750 | |
| 1 cf. as produced | 28.3 | 810 | 310 | 5640 | 0.07 |
| 1 cf. Washed | 20.0 | 120 | 603 | 327 | |
| 2 as produced | 31.2 | 880 | 520 | 8230 | 0.33 |
| 2 washed | 25.8 | 637 | 631 | 6630 | |
| 3 as produced | 29.2 | 756 | 541 | 6194 | 0.29 |
| 3 washed | 21.1 | 539 | 598 | 4930 | |
| 4 as produced | 24.5 | 662 | 632 | 5980 | 0.27 |
| 4 washed | 20.2 | 521 | 606 | 4760 | |
| 5 as produced | 23.1 | 489 | 136 | 4155 | 0.07 |

Table 2 shows the characteristics of roughness of the sheets of examples 2–4, and comparison examples 1–2. A high level of roughness, although spoiling the aesthetic appearance, is critical for the printability of the sheet with printing inks.

TABLE 2

SURFACE ROUGHNESS

| EXAMPLE | ROUGHNESS (micron) |
|---|---|
| 2 | 0.20 |
| 3 | 0.20 |
| 4 | 0.24 |
| cf. 1 | 0.14 |
| cf. 2 | 1.17 |

Tables 3 and 4 show test data for tear and impact traction.

TABLE 3

TEAR TESTS AT 23° C. & 50% RH(*)

| Examples | Start tearing N/mm | Propagation N/mm |
|---|---|---|
| 1 as produced | 116.5 | 116.5 |
| 2 as produced | 85.6 | 85.7 |
| 1 cf. as produced | 64 | 63.8 |

(*)ASTM standard d-1938

TABLE 4

IMPACT-TRACTION TESTS AT 10° C. AND RH < 5% (**) ON FILM OF 30 micron

| Example | Energy KJ/m2 | Load Mpa |
|---|---|---|
| 1 | 110 | 30 |
| 2 | 73 | 24 |
| 1 cf. | 6 | 12 |
| 2 cf. | 22 | 23 |
| 5 | 145 | 18 |

(**) The tests were carried out using instrumentation comprising a conventional "piezoelectric load cell" for detecting the energy, which cell is located on a terminal on which the end of a test specimen is fixed, 30–40 micron thick, 30 mm wide and 35 mm long.

The test were carried out using instrumentation comprising a conventional "piezoelectric load cell" for detecting the energy, which cell is located on a terminal on which the end of a test specimen is fixed, 30–40 micron thick, 30 mm wide and 35 mm long.

A double incision was made symmetrically half way along the sample such that each incision extended over a quarter of the width of the sample. A rod was connected to the other end of the sample, which rod acts as a guide for an axially-pierced cylinder, 500 g in weight. The rod terminates in a plate onto which the weight is released from a height of 5 cm at a velocity of 1m/sec.

The apparatus was arranged within a climatic cell operating at 10° C. and RH<5%.

The sample were conditioned at the same temperature for 48 hours before the test.

TABLE 5

PROPERTIES OF SHEET FORMED VIA CAST-EXTRUSION

| Examples | Load Mpa | Elongation % | Modulus Mpa |
|---|---|---|---|
| 2 as produced | 37.3 | 892 | 271 |
| 2 washed | 30.1 | 630 | 464 |
| 3 as produced | 35.0 | 846 | 379 |
| 3 washed | 26.2 | 595 | 550 |
| 4 as produced | 32.5 | 745 | 351 |
| 4 washed | 21.0 | 531 | 495 |

FIGS. 1 and 2 show respectively the second derivative FTIR and X-ray spectra of the composition of example 1.

What is claimed is:

1. Heterophasic compositions comprising starch, a thermoplastic polymer which is incompatible with starch and a plasticizer, in which the starch constitutes the dispersed phase and the thermoplastic polymer the continuous phase, said compositions having impact strength greater than 30 KJ/m$^2$ measured on blown film having a thickness of 30 microns at 10° C. and RH less than 5%.

2. Heterophasic compositions according to claim 1 comprising starch, a thermoplastic polymer which is incompatible with starch and a plasticizer, in which the starch constitutes the dispersed phase and the thermoplastic polymer the continuous phase, having impact strength greater than 30 KJ/m$^2$ measured on blown film having a thickness of 30 microns at 10° C. and RH less than 5%, and further characterised in that the x-ray diffraction spectrum of the compositions present a peak at an angle 2 theta in the range of 13–14° the ratio of the intensity of which in relation to that of the peak of the amorphous starch which appears at about an angle 2 theta of 20.5° is less than 2 and greater than 0.02.

3. Heterophasic compositions comprising starch, and a thermoplastic polymer which is incompatible with starch, in which the starch constitutes the dispersed phase and the thermoplastic polymer the continuous phase having impact strength greater than 30 KJ/m$^2$ measured on blown film having a thickness of 30 microns at 10° C. and RH less than 5% obtained extrusion of a melt comprising starch, the thermoplastic incompatible polymer, a plasticizer liquid at room temperature used in amount from 2 to 8% on the weight of the starch and the thermoplastic polymer and water in amount less than 5% measured at the exit of the extruder before conditioning said melt being extruded by applying an extrusion energy of 0.2 to 0.5 KWh/kg.

4. Compositions according to claim 3, in which the quantity of plasticiser or mixture of plasticisers is between 3 and 7% by weight of the total of the starch and the thermoplastic polymer and the specific extrusion energy is from 0.2 to 0.5 Kw.h/Kg.

5. Compositions according to claim 1, wherein the starch-incompatible thermoplastic polymer is selected from the group consisting aliphatic polyesters obtained from the aliphatic hydroxyacids having 2 or more carbon atoms, from the corresponding lactones or lactides, from aliphatic bicarboxylic acids having 2 or more carbon atoms, from diols having 2 or more carbon atoms, from aliphatic-aromatic copolyesters, polyester-amides, polyester-ether-amides, polyester-urethanes, polyester-urea and mixtures thereof.

6. Compositions according to claim 5 wherein the polyester is selected from the group consisting of poly-epsylon-caprolactone, polyethylene, polybutylene-succinate, polyalkyleneadipate, diphenol diglycidylether polyadipate, polyalkyleneadipate-succinate, polyalkyleneadipate-epsylon-caprolactone, poly-epsylon-capro-lactone/epsylon-caprolactame, polybutyleneadipate-co-terephthalate, polyalkylenesebacate, and polyalkylenezelate.

7. Compositions according to any of claim 2, in which the plasticiser is a polyhydric alcohol having from 2 to 22 carbon atoms.

8. Compositions according to claim 7, wherein the plasticizer is selected from the group consisting of glycerine, polyglycerol, glycerol ethoxylate, sorbitol acetate, sorbitol diacetate, sorbitol mono- and diethoxylate and mixtures thereof.

9. Compositions according to claim 8 wherein the plasticizer is glycerine.

10. Compositions according to claim 1, including an interfacing agent selected from the classes of compounds consisting of:
   a) esters of polyhydric alcohols with-mono- or polycarboxylic acid with a dissociation constant pK less than 4.5 (compared to the pK of the first carboxylic group in the case of polycarboxylic acids), and a hydrophilic/lipophilic index (HLB) greater than 8; (b) esters of polyhydric alcohols with mono- or polycarboxylic acid having fewer than 12 carbon atoms, pK values of less than 4.5 and an HLB index of from 5.5 to 8; (c) esters of polyhydric alcohols with C12–C22 fatty acids having an HLB index less than 5.5; (d) non-ionic, water soluble surfactants; and (e) reaction products of aliphatic or aromatic diisocyanates with polymers containing terminal groups reactive with the diisocyanates.

11. Compositions according to claim 1 presenting a band at 947 cm$^{-1}$ in the second derivative FTIR spectrum thereof.

12. Manufactured products obtained from the compositions of claim 1.

13. Films, sheets, bags, laminates, moulded articles, profiles, expanded sheets, thermoformed articles, expanded materials obtained from the compositions of claim 1.

14. Shopping bags obtained from the compositions of claim 1.

15. Mulch films obtained from the compositions of claim 1.

16. Wrapping films obtained from the compositions of claim 1.

17. A method for preparing the compositions of claim 1, in which a melt comprising the starch, the starch-incompatible thermoplastic polymer, the plasticizer and water with a final content adjusted to less than 5% by weight, is extruded in an extruder provided with screws having a reverse profile for more than 30% of the length of the screw.

* * * * *

UNITED STATES PATENT AND TRADEMARK OFFICE
CERTIFICATE OF CORRECTION

PATENT NO. : 6,348,524 B2  
DATED : February 19, 2002  
INVENTOR(S) : Catia Bastiolo et al.

It is certified that error appears in the above-identified patent and that said Letters Patent is hereby corrected as shown below:

Title page,  
Item [56], References Cited, OTHER PUBLICATIONS, please change "Basatioli" to -- Bastioli --;

Item [56], References Cited, FOREIGN PATENT DOCUMENTS, two references are missing. Therefore, please insert -- EP 0 327 505 A2 8/1989 -- and -- EP 0 696 611 A2 2/1996 --;

Column 9,  
Line 39, please change "C." to -- C --;  
Line 46, please change "C." to -- C --;  
Line 58, please change "C." to -- C --;  
Line 59, after "obtained" please insert -- by --;  
Line 67, please change "plasticiser" to -- plasticizer -- and "plasticisers" to -- plasticizers --;

Column 10,  
Line 3, please change "Kw.h/Kg." to -- Kwh/kg. --;  
Line 6, after "consisting" please insert -- of --;  
Line 20, please change "polyalkylenesebacate" to -- polyalkylenesebaca-te --;  
Line 21, please delete "any of".

Signed and Sealed this

Sixteenth Day of July, 2002

*Attest:*

JAMES E. ROGAN  
*Attesting Officer*     *Director of the United States Patent and Trademark Office*

UNITED STATES PATENT AND TRADEMARK OFFICE
CERTIFICATE OF CORRECTION

PATENT NO. : 6,348,524 B2
DATED : February 19, 2002
INVENTOR(S) : Catia Bastioli et al.

It is certified that error appears in the above-identified patent and that said Letters Patent is hereby corrected as shown below:

<u>Title page,</u>
Item [75], Inventors(s), please change "Catia Bastiolo et al." to
-- Catia Bastioli et al. --.

Signed and Sealed this

Twenty-fourth Day of December, 2002

JAMES E. ROGAN
*Director of the United States Patent and Trademark Office*